United States Patent
Bursik et al.

(10) Patent No.: US 11,100,152 B2
(45) Date of Patent: Aug. 24, 2021

(54) DATA PORTAL

(71) Applicant: Target Brands, Inc., Minneapolis, MN (US)

(72) Inventors: Jeffrey Jacob Bursik, Farmington, MN (US); Robert James Koste, Brooklyn Park, MN (US)

(73) Assignee: TARGET BRANDS, INC., Minneapolis, MN (US)

(*) Notice: Subject to any disclaimer, the term of this patent is extended or adjusted under 35 U.S.C. 154(b) by 511 days.

(21) Appl. No.: 15/679,878

(22) Filed: Aug. 17, 2017

(65) Prior Publication Data

US 2019/0057147 A1 Feb. 21, 2019

(51) Int. Cl.
*G06F 16/35* (2019.01)
*G06F 16/38* (2019.01)
*G06F 16/954* (2019.01)
*G06F 16/25* (2019.01)

(52) U.S. Cl.
CPC ............ *G06F 16/35* (2019.01); *G06F 16/256* (2019.01); *G06F 16/38* (2019.01); *G06F 16/954* (2019.01)

(58) Field of Classification Search
CPC .. G06F 12/0808; G06F 9/5055; G06F 9/5083; G06F 16/254; G06F 3/0482; G06F 11/1451; G06F 11/1469; G06F 12/0871; G06F 16/24556; G06F 2201/80; G06F 2201/805; G06F 3/0656; G06F 11/1456; G06F 11/1458; G06F 16/951
USPC ........... 707/600–831, 899, 999.001–999.206
See application file for complete search history.

(56) References Cited

U.S. PATENT DOCUMENTS

| | | | |
|---|---|---|---|
| 6,285,999 B1 | 9/2001 | Page | |
| 7,350,191 B1* | 3/2008 | Kompella | G06F 9/44526 717/108 |
| 7,711,702 B2 | 5/2010 | Smolen et al. | |
| 9,378,265 B2 | 6/2016 | McHenry et al. | |
| 9,516,029 B2 | 12/2016 | Das et al. | |
| 9,576,269 B2 | 2/2017 | Bendik | |
| 2002/0022952 A1* | 2/2002 | Zager | H04L 41/0233 703/22 |
| 2004/0255048 A1* | 12/2004 | Lev Ran | G06F 16/9574 709/249 |
| 2007/0055680 A1 | 3/2007 | Statchuk | |
| 2007/0208744 A1* | 9/2007 | Krishnaprasad | G06F 16/248 |
| 2008/0208820 A1* | 8/2008 | Usey | G06F 16/313 |
| 2009/0106234 A1* | 4/2009 | Siedlecki | G06Q 30/0276 |
| 2009/0150169 A1 | 6/2009 | Kirkwood et al. | |

(Continued)

FOREIGN PATENT DOCUMENTS

WO 20130150509 A1 10/2013

*Primary Examiner* — Angelica Ruiz
(74) *Attorney, Agent, or Firm* — Merchant & Gould P.C.

(57) ABSTRACT

The subject matter of this disclosure relates to a software platform that ingests data from a variety of data sources, processes the data, and makes the data available for search. In addition, a data portal is described through which users can quickly find information and improve metadata to take advantage of the enterprise's data assets. Various aspects of disclosed software platforms include technologies for obtaining metadata without touching underlying data assets, technologies for using table or database lineage as a factor in determining document relevance, processes for receiving data pushed from data sources, and processes for exposing what a user needs to do to access particular data assets.

20 Claims, 5 Drawing Sheets

(56) References Cited

U.S. PATENT DOCUMENTS

| | | | | |
|---|---|---|---|---|
| 2009/0254971 A1* | 10/2009 | Herz | .................. | G06Q 30/02 |
| | | | | 726/1 |
| 2011/0173225 A1* | 7/2011 | Stahl | .................. | G06Q 30/04 |
| | | | | 707/769 |
| 2012/0246137 A1* | 9/2012 | Sallakonda | ......... | G06F 16/4393 |
| | | | | 707/709 |
| 2012/0272304 A1* | 10/2012 | Liao | ................. | G06F 16/2455 |
| | | | | 726/6 |
| 2013/0283231 A1* | 10/2013 | Van Megchelen | .... | G06F 16/955 |
| | | | | 717/106 |
| 2014/0033074 A1* | 1/2014 | Thibaux | ............. | G06Q 50/01 |
| | | | | 715/753 |
| 2014/0279622 A1* | 9/2014 | Lamoureux | ........ | G06Q 10/1053 |
| | | | | 705/319 |
| 2016/0210427 A1* | 7/2016 | Mynhier | ............. | G16H 10/60 |
| 2018/0276304 A1* | 9/2018 | Peled | ................. | G06F 16/951 |

* cited by examiner

DATA PORTAL

TECHNICAL FIELD

The present disclosure relates generally to data access within an organization, and in particular to a data portal useable within such an organization.

BACKGROUND

Organizations often have large amounts of data assets scattered across different data sources. This can make finding data difficult. While document management and search services exist, it remains difficult for users to search across different data sources and identify most-relevant results for a query. In this manner, a person attempting to perform analysis on, for example, inventory data may be able to perform a limited search but would likely also need to supplement the search by following up with individuals within the organization.

Existing systems for performing document search within an organization are generally inefficient. Data, including various documentation or reports that are published or otherwise available within an organization change rapidly within large organizations, or are located in storage areas for which the underlying database or folder structure may change. Accordingly, when such data is queried, each query typically is performed against the data stored across the organization, which takes a substantial amount of time for each query to be performed. Furthermore, query results may be returned to a user without adequate context; as such, multiple iterations or versions of a report that might satisfy a query could be returned, without adequate context for which version includes all relevant data, or is most up-to-date. Accordingly, improvements in data access within an organization are desirable.

SUMMARY

The subject matter of this disclosure includes a software platform that provides visibility and discovery to a data environment. The platform can enable users to find information and utilize data assets. In an example, the software platform ingests data from a variety of data sources, processes the data, and makes the data available for search. The platform can provide a portal that users can access to locate information. The platform may also allow the user to improve performance of the platform by tagging, rating, and commenting on data assets contained therein.

In one aspect, a method includes obtaining, from a data source, metadata describing underlying data assets, wherein the metadata is obtained without accessing the underlying data assets; storing the metadata in association with a search service; and making data stored in association with the search service available over a data portal.

In a second aspect, a method includes receiving a query from a device; searching, based in part on the query, data associated with a search service to obtain search results, wherein at least one search result of the obtained search results is associated with database data asset comprising a database table or database report; determining relevance of the database data asset to the query based, in part, on a lineage of the database data asset; and providing the search results to the device in response to the query based, in part, on the determined relevance.

In a third aspect, a non-transitory computer readable medium is disclosed. The medium includes instructions that, when executed by a processor, cause the processor to perform a process comprising: obtaining, from a data source, metadata describing underlying data, wherein the metadata is obtained without accessing the underlying data; storing the metadata in association with a search service; and making data stored in association with the search service available over a data portal.

Various additional aspects of disclosed software platforms include technologies for obtaining metadata without touching the raw underlying data, technologies for using table or database lineage as a factor in determining document relevance, processes for receiving data pushed from data sources, and processes for exposing what a user needs to do to access particular data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
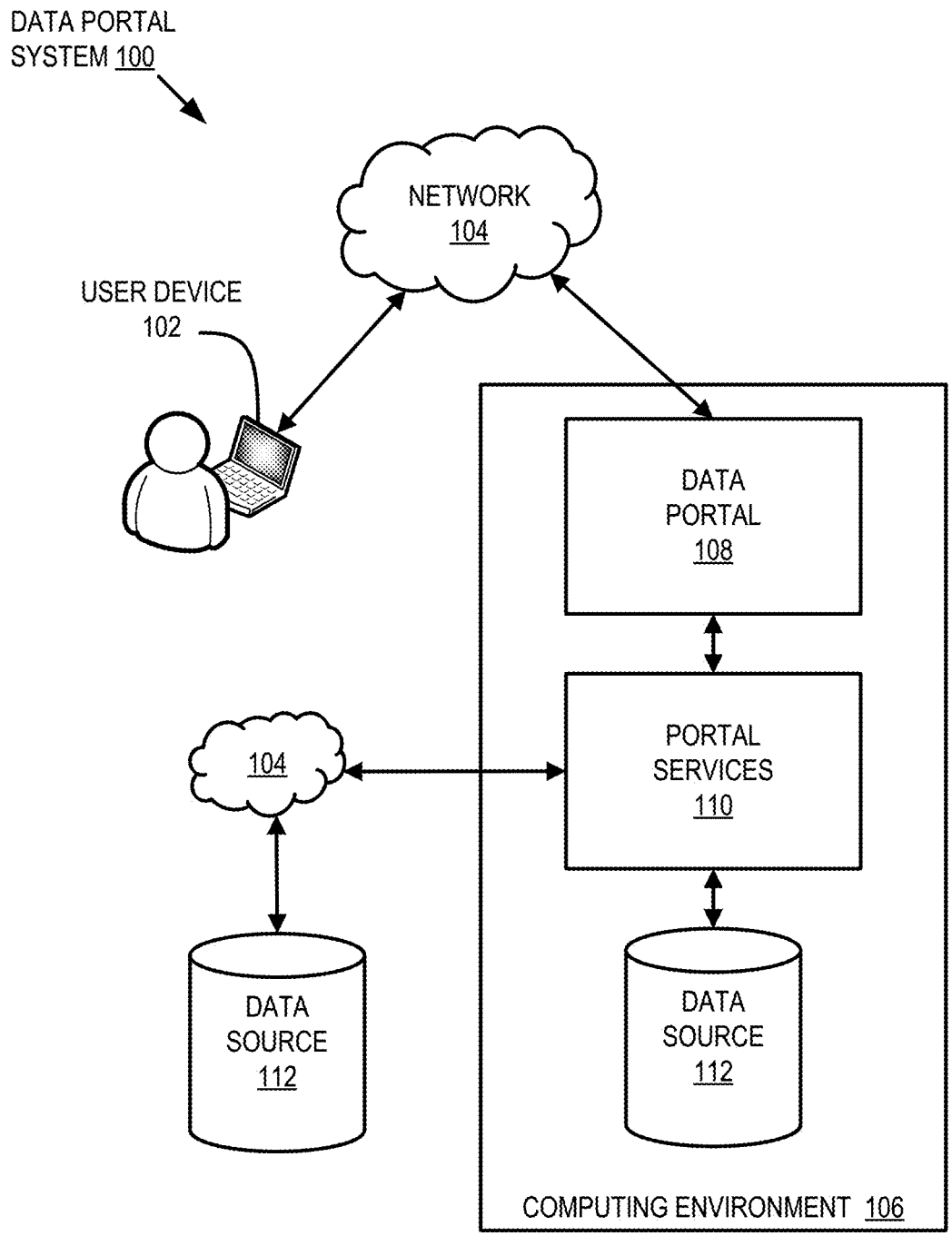
FIG. 1 illustrates an example data portal system.

Disclosed examples include software platforms that ingest data from a variety of data sources, process the data, and make the data accessible users over a data portal. In this manner, disclosed examples provide a data portal through which users can quickly find information and take advantage of an enterprise's data assets. In an example, the portal can help answer user questions regarding where data assets exist (e.g., what is the path to a server or database where particular data is stored?), what data assets describe (e.g., what are the fields within a database data asset or what is the structure of a report?), how to gain access to data assets (e.g., who can I contact to gain access to a particular data asset), when data assets were last used, when data assets were last updated, what is the lineage of data assets (e.g., where did the data asset come from and where was it subsequently used), and what the community thinks of data assets, among other user questions.

The software platform can obtain data from data sources in a variety of different ways, such as using a crawler or receiving data pushed from the sources. In some examples, the obtained data are the data assets themselves. In some examples, only metadata of the data assets is obtained, rather than the data underlying the metadata. For example, where the data asset is an email, the metadata may be information describing the date, sender, recipient, and other data about the email, and the underlying data may be actual content of the email itself (e.g., the text of the subject, text of the message, content of any attachments, etc.) An example may be a report, with metadata around the name of the report, creator, date created/updated, description, owner, and fields on the report, among other data. Data assets can include any of a variety of different kinds of data assets, including but not limited to documents, reports, messages (e.g., emails), multimedia content (e.g., audio, video, or images), databases, and messaging service data, API's, Data Movement Jobs, among other kinds of data. The obtained data assets (or metadata regarding the data assets) can then be stored in such a way to provide search or other services on top of the data.

To facilitate organization of data, different kinds of metadata source models can be used to organize data from data sources. In an example, these different kinds of models include reports, data stores, data movement jobs, messaging services, and nomenclature. Reports present data to end-users. Sources of reports include, but are not limited to business intelligence platforms, data visualization platforms, and document management platforms, among others. Data stores retain or otherwise store data. Data stores can include data warehousing platforms, databases, customer relationship management platforms, distributed storage platforms, document management platforms, and productivity platforms, among others. Data movement jobs are tasks or jobs intended to move or transform data. Data movement jobs can include jobs originating in extract-transform-load tools, data analytics tools, and business intelligence suites, among others. Messaging services can refer to any messaging services, such as Application Programming Interfaces (APIs) and stream processing platforms (e.g., APACHE KAFKA), among others. Nomenclature can include definitions of metrics, attributes, abbreviations, acronyms, and jargon, among others. Different organizations or different parts of an organization may use different nomenclature to represent a same concept.

The platform can also be configured to receive data pushed from the data sources without needing to query the data sources for information. In this manner, newly-created data can be pushed to the platform and searched without needing to wait for data assets to be crawled. The obtained data can then be sent to a messaging queue, which can feed the data to a search service and a database for reporting and backup.

Examples of data portals disclosed herein can include a variety of different kinds of features, including: search features (e.g., enabling users to intuitively and quickly search for data), data management features (e.g., scoring data and providing reports based on rules), executable features (e.g., providing users with the ability to build queries and execute reports through the user interface of the portal), user data (e.g., metadata) export features (e.g., providing users with the ability to extract data from the portal), workflow features (e.g., providing users with the ability to make and track changes, as well as the ability to be notified of changes), scanning features (e.g., providing users with the ability to manually or programmatically import data and the ability to leverage application programming interface queries), tagging features (e.g., providing users with the ability to tag data to allow for faster searching and filtering), commenting features (e.g., providing users with the ability to add comments to data assets), rating features (e.g., providing users with the ability to add ratings, such as star ratings, to data), data mining features (e.g., providing users with the ability to personalize, analyze, and digest data through the portal), backend database features (e.g., using a backend database that holds data knowledge), stitching features (e.g., connecting data between various sources and showing data lineage and dependencies), visualization features (e.g., providing users with the ability to see data flow in a graphical layout), data access remedy features (e.g., letting users know what they need to do to access restricted files), and nomenclature features (e.g., providing users with the ability to retain institutional knowledge, data, such as by parsing and processing acronyms), among others.

Disclosed embodiments can provide several advantages over traditional data portals, including reduced time to find data and reports, reduced duplication of report and data, cleaning up of existing data environments, and increasing trust of data and the data environment. Some examples can further provide improved security by collecting metadata without accessing data underlying the metadata. In this manner, the security of the data portal is increased by containing metadata which is comparatively less sensitive than underlying data. Further, metadata is typically smaller in size than the underlying content and therefore the platform may be able to process information and respond to user queries more quickly than if it contained the underlying data itself.

FIG. 1 illustrates an example data portal system 100. The system 100 includes a user device 102 connected over a network 104 to a computing environment 106 that provides a data portal 108. The computing environment 106 further includes data portal services 110 that facilitate processing queries received by the data portal 108, obtaining data for the data portal 108, and processing data, among other services. The portal services 110 can be connected to data sources 112. The data sources 112 may be stored locally on the computing environment 106 or connected to the computing environment 106 over the network 104.

The data portal 108 is a user-facing interface with which users can interact to access various capabilities provided by the computing environment 106, including search capabilities and capabilities for crowd-sourcing metadata. The format of the data portal 108 can be flexible. In an example, the data portal 108 is a website that provides capabilities to the user. In another example, the data portal 108 is an application executable on a user device (e.g., a smartphone application, desktop software, etc.) that provides capabilities to the user. In yet another example, the data portal 108 can be configured as a chat bot or another interactive program that the user can contact. Given the flexibility of the data portal 108, while FIG. 1 illustrates the data portal 108 as being a part of the computing environment 106 (e.g., a website hosted by or having assets provided by the computing environment 106), it need not be. For example, the data portal 108 can be an application locally-installed on the user device 102 that communicates with the computing environment 106 over the network 104 to access data portal services 110 to provide data portal capabilities to the user.

The user device 102 can be any device suitable for accessing the data portal 108. For example, where the data portal 108 is a website, the user device 102 can be any suitable computing device for accessing the website. Where the data portal 108 is a locally-installed application, the user device 102 can be any suitable computing device for executing a locally-installed application. An example of an architecture of a user device 102 is provided in FIG. 5.

The network 104 is an electronic communication medium that facilitates communication between multiple different devices (e.g., user device 102 and computing environment 106 as illustrated in FIG. 1). The network 104 can include links between multiple computing devices and can include a variety of different kinds of hardware (e.g., routers, hubs, servers, etc.) or software to connect the devices. The network 104 can vary in scope and configuration. In some examples, the network 104 is a local area network, a wide area network (e.g. the Internet), or an intranet, among others.

The computing environment 106 can be any computing environment suitable for providing portal services 110. In many embodiments, the computing environment may be a server or a virtual machine running on a server, but other implementations may also be used. An example of an architecture of a computing environment 106 is provided in FIG. 4.

The portal services 110 can take a variety of forms, including one or more software engines configured to provide services. Although illustrated as being part of a single computing environment 106, one or more aspects of the portal services 110 can be located elsewhere or scattered across multiple different computing environments 106. Examples of services provided by the portal services 110 are described in more detail with respect to FIG. 2.

The data sources 112 can be one or more sources of data. These data sources 112 can be any of a variety of different kinds of data sources, including data stored locally on the user device 102, data stored locally on the computing environment 106, data stored on a corporate network, and data hosted by third parties, among other data. The data sources 112 can be located in a variety of different locations. For example, while some data sources 112 may be stored locally on the computing environment 106, some data sources may be accessible to the computing environment 106 over the network 104.

In an example, data sources 112 can include but need not be limited to business intelligence platforms (e.g., MICROSTRATEGY ANALYTICS by MICROSTRATEGY, INC.; WEBFOCUS by INFORMATION BUILDERS, INC.; ORACLE HYPERION products by ORACLE CORP.; products by DOMO, INC.; business intelligence automation products, etc.), data visualization platforms (e.g., products by TABLEAU SOFTWARE, INC.; products by ERWIN, INC.; etc.), data warehousing platforms (e.g., SAP BW, products by TERADATA CORP., etc.), databases (e.g., IBM DB2, database products provided by ORACLE CORP., MONGODB databases, etc.), customer relationship management platforms (e.g., products by SALESFORCE.COM, INC.), distributed storage platforms (e.g., built using the APACHE HADOOP framework), extract-transform-load platforms (e.g., IBM INFOSPHERE DATASTAGE), and data analytics platforms (e.g., THOMSON REUTERS DATASTREAM; products provided by SAS INSTITUTE, INC.; etc.), among others. Data sources 112 can further include platform components, such as message brokers (e.g., RABBITMQ by PIVOTAL SOFTWARE, INC.) and stream processing platforms (e.g., APACHE KAFKA), among others.

Figure 2:
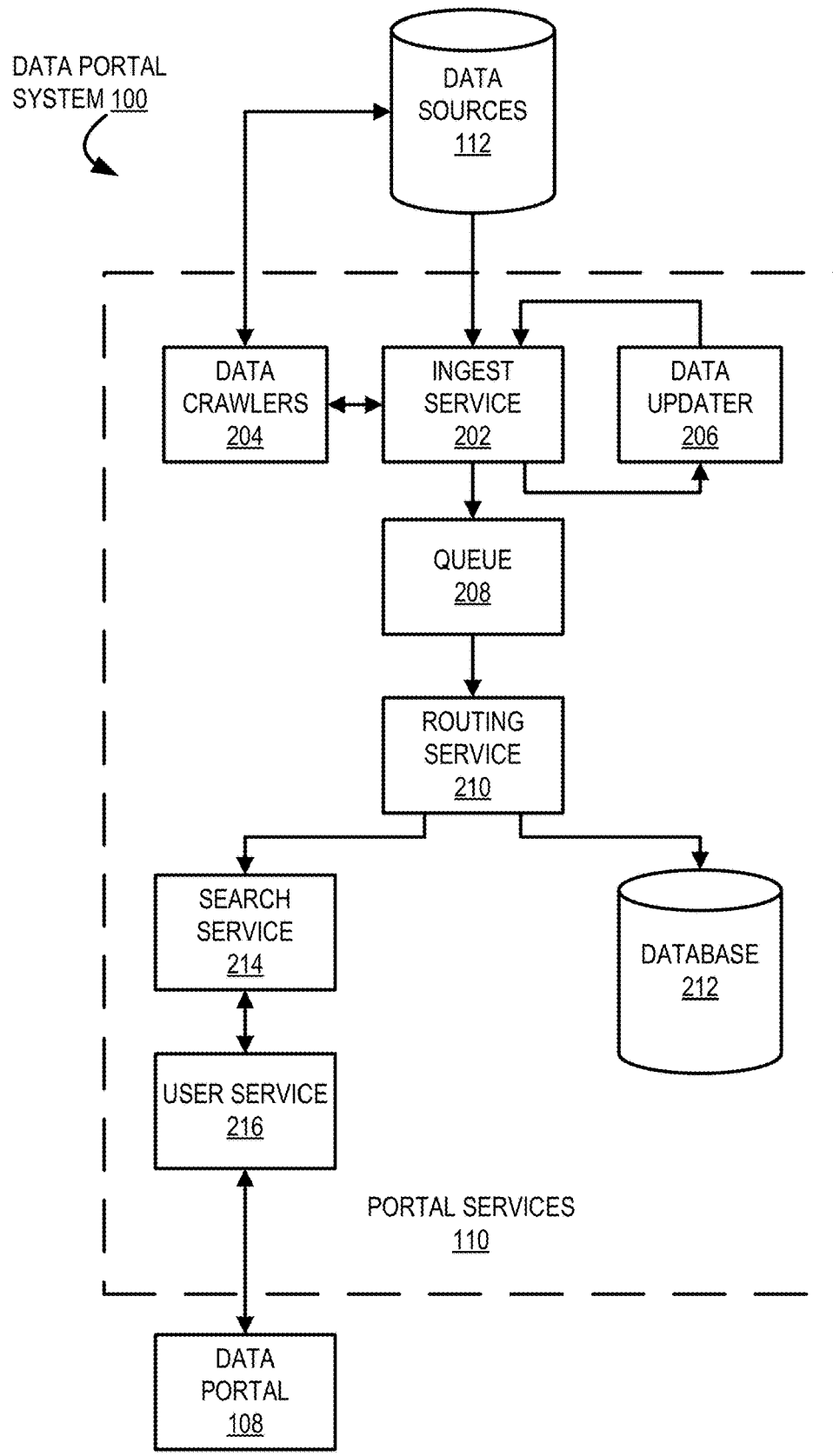
FIG. 2 illustrates a portion of the data portal system of FIG. 1 with additional detail in an example implementation of portal services.

FIG. 2 illustrates a portion of the data portal system 100 of FIG. 1 with additional detail in an example implementation of portal services 110. Information from the data sources 112 can arrive at the data portal services 110 through an ingest service 202.

The ingest service 202 can allow for real-time ingestion of data into the data portal services 110 from the data sources 112. In some examples only metadata is ingested and the data underlying the metadata is not ingested. The metadata can include information about a data asset's: name, file format, location, size, dates (e.g., date created, date modified, date last accessed, etc.), access or other security information, author information, and other metadata. Where the data asset is a database or is related to a database, the metadata can include data regarding tables of the database, fields within the database, relationships among information in the database, and database lineage information, among other metadata.

The data can be ingested in a variety of ways. In an example, the data is ingested using a Representational State Transfer (REST) API allowing for data source platforms (e.g., third-party data providers) to send structured JavaScript Object Notation (JSON) data to an endpoint of the portal services 110. In this manner, the data source platforms can push data to platform ingest service 202. As the data is received, it can be broken down and threaded for increased ingestion speed. Data can then be persisted onto a messaging bus (e.g. as part of queue 208). And then the routing service 210 can facilitate building structures optimized for search.

In an example, the ingest service 202 extracts metadata objects from the received data or identifies metadata objects contained therein. For example, if the obtained data is data regarding the data source, then metadata regarding the data source, a data grouping, a data set, and attributes can be obtained. If the data is a report, then metadata regarding the report, the source of the report, and a report object can be obtained. If the data is a delete topic request, then metadata regarding a message source and a message topic can be obtained. If the data is regarding a data movement job, then metadata regarding the data movement and the movement job can be obtained.

In addition to or instead of data sources 112 sending data directly to the ingest service 202, data crawlers 204 may be used as an intermediary between the data sources 112 and the ingest service 202. For example, the portal services 110 may control one or more data crawlers 204 configured to access (e.g., query) data sources 112, obtain new or updated data, format the data in a usable manner, and provide the data to the ingest service 202 for ingestion. In an example, there may be data crawlers 204 for each of a plurality of different data sources 112. For example, there can be a crawler 204 for each business intelligence suite, each data visualization suite, each data storage provider, each data warehousing product, each database provider, each data movement tool provider, each business intelligence suite provider, and so on.

In an example, the data crawlers 204 are implemented using an application framework such as the SPRING FRAMEWORK by PIVOTAL SOFTWARE, INC. for the Java programming language. In an example, one or more data crawlers 204 may connect to an instance of a service discovery framework (e.g., EUREKA) to level an ingest service using an HTTP client binder (e.g., FEIGN).

In some examples, the ingest service 202 and/or the data crawlers 204 only receive or obtain metadata describing underlying data without accessing the underlying data or obtaining the underlying data. For example, an API of the data sources 112 can be used that accesses metadata but not the underlying data. In another example, the underlying data is accessed by the portal services 110, but the underlying data is not ingested-only the metadata is. In still other examples, the ingest service 202 generates or determines metadata and filters out data underlying the metadata such that the underlying data does not become searchable or otherwise available over the portal 108.

In an example, the data source 112 can have a repository or set of logs about its data assets and associated metadata. The ingest service 202 can connect to the data source 112 and collect the metadata around the data asset without accessing the underlying asset. In this manner, security can be preserved. For example, accessing specific data assets may require elevated permissions (e.g., admin/delete access) which then puts the system and data asset at risk for an attack. By accessing metadata, that risk is reduced either because no such elevated permissions are needed to access the metadata or because metadata is comparatively less sensitive than the underlying data. In an alternative approach, individual platforms can to send data to ingest service 202. This provides a secondary option that removes the need for the ingest service 202 to have access to the actual data.

Generally, the ingest service 202 is configured to receive data for use by the portal services 110, but in some examples the ingest service 202 can also perform data processing to parse, cleanse, and apply logic to the data as needed. One example of this comes in the form of nomenclature services, which can standardize language across different inputs based on the use of nomenclature within the data. For example, table names across different databases use different words, phrases, formats, or abbreviations to refer to the same kind of data. The ingest service 202 abbreviation service can derive a common name and use the common name rather than the default names in the data. This can allow for standardization of data as well as compliance with data governance standards.

In an example, the nomenclature services can be implemented in any of a variety of ways. In one instance, the nomenclature service includes a look-up table for translating commonly used terms into a standard form. In some examples, the ingest service 202 can flag nomenclature that is unknown, and users of the data portal 108 may be able to see the flagged nomenclature and provide context to the flagged item. In some examples, the nomenclature service may include a data structure storing known nomenclature and include information for standardizing nomenclature (e.g., the data structure may indicate that "Q2_Sales" and "Sales_Q2" both refer to the same kind of data: second quarter sales, and can be standardized accordingly on a common name). Where the ingest service 202 receives unknown nomenclature, the ingest service 202 can flag the unknown nomenclature and prompt a user (or even the data's author) that the information can be improved by providing additional information regarding the data. In some examples, a machine learning framework can be trained and used to classify data and standardize nomenclature.

In an example, the nomenclature service relies on a data updater 206 to update the data based on output of the nomenclature services (e.g., replace an abbreviation with a full name or add a tag to the data that includes expanded abbreviation) and then feed the updated data back to the ingest service 202 for processing.

As another example of data processing as part of the ingest service 202, the ingest service 202 can use a polygraph to ensure data consistency and up-to-date information. A polygraph is an artifact that compares incoming metadata to data currently in a repository (e.g., stored in database 212, indexed by search service 214, or otherwise already known or accounted for by the portal services 110) to determine if objects have been deleted or updated, and then properly update the repository. For example, a data report "Report A" is created with metrics "Metric 1" and "Metric 2" and field "Field ABC". Report A is ingested by the ingest service 202 and is made available in the data portal 108. Next, Report A is updated and Metric 2 is deleted. As the updated Report A is ingested with Metric 1 and Field ABC, the ingest service 202 can identify the update and Metric 2 can be marked as inactive and can be made unavailable for search. Though the inactive metric can be deleted, it can instead be retained for reporting or compliance purposes.

In an example, it can be determined that Report A and updated Report A refer to the same report based on a unique identifier for the reports received from the data source. For example, each data source (e.g., server or project) may have a unique identifier as well as a unique identifier for individual data assets (e.g., reports). As Report A is ingested again (or not), then a polygraph can use the identifier to know to set the report as deleted, updated, or otherwise modified. This can help keep the catalog current as well as allows tracking of what data assets are changed or deleted over time in case there is a dependency that may cause an outage.

After the data is ingested by the ingest service 202, the data can be sent to the queue 208. In an example, the queue 208 can be implemented using a messaging queue (e.g., RABBITMQ by PIVOTAL SOFTWARE, INC.). There can be a variety of different queues, such as data source queues, repot queues, data movement queues, and message queues.

The routing service 210 can be used to orchestrate and publish consumed messages from the queue 208 into the search service 214 and the database 212. The routing service can listen to the queue and take the messages from the queue 208 and push the messages to the search service 214. The routing service 210 can configure a number of parallel listeners to handle high-volume messages. The routing service 210 can route data, use a rules engine, and load data for searching (e.g., by cooperating with the search service 214). The routing service 210 can create indices when new source universally unique identifiers are processed. To ensure proper field mapping, proper parent/child relationships, and allow for field search changes, custom dynamic mappings can be used.

The database 212 can store data for reporting, backup, or other purposes. In some examples, the database 212 cooperates with the search service 214 to provide search results. In other examples, the database 212 and search service 214 are largely independent. The database 212 can be implemented in a variety of ways, including but not limited to a document-oriented database (e.g., MONGODB by MONGODB, INC.).

The search service 214 can be used to allow users to search for data. In an example, the search service 214 can obtain and index data (e.g., data retrieved through the ingest service 202 and sent to the search service 214 over the routing service 210) to facilitate searching, in addition to responding to search queries from the user. In an example, the search service 214 enables search via a REST endpoint. In an example, the search service can include a search engine (e.g., a search engine implemented using ELASTICSEARCH). The search engine can be configured to provide for matching on terms, search analyzers, search queries, and boosting on matches. Further, the search service 214 can provide filters to allow end users to quickly narrow down and find data assets for which they are looking. Filters can be data driven and can represent aggregations of data based on metadata source models.

The search service 214 can leverage metadata fields for all metadata source models, including reports, data stores, data movement jobs, messaging services, and nomenclature. For example, name and description metadata can provide significant information that can be searched against. Other metadata, such as tags, owner, and other remaining metadata attributes can also be valuable in a search. The search service 214 can be configured to search for matches on those values and boost the relevance to help make those objects more visible in a search result list. For example, the metadata source fields can be used to increase relevance on fields that have the most value to the search algorithm. This information can be used to rank results based on a score to facilitate providing relevant results to the user. An example service for ranking results is shown and described in relation to FIG. 3.

Figure 3:
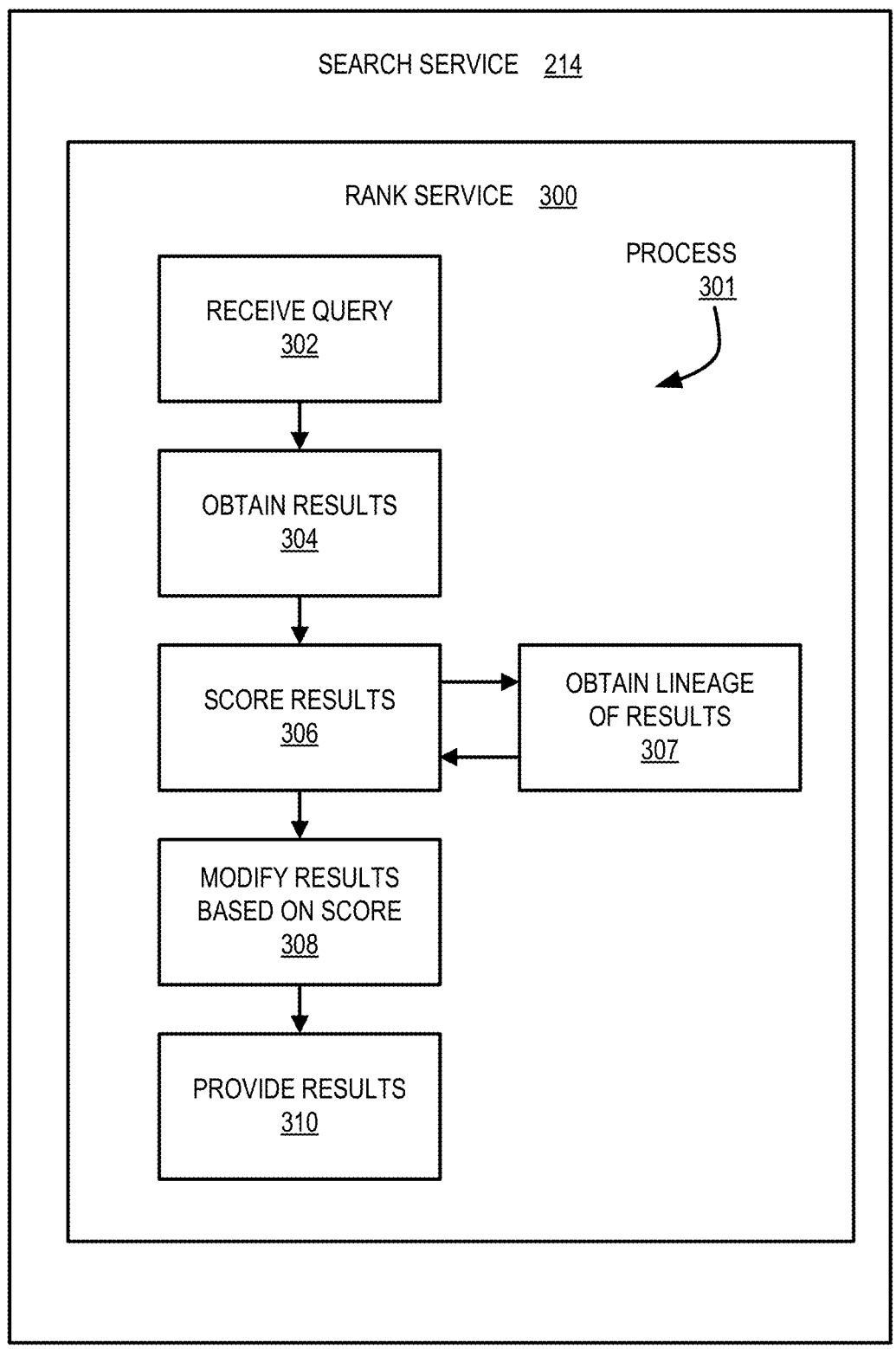
FIG. 3 illustrates an example rank service that can be used by the search service to provide results to the user.

FIG. 3 illustrates an example rank service 300 that can be used by the search service 214 to provide results to the user. In an example, the rank service 300 can implement a process 301 for ranking and providing results to the user. The process 301 can begin with operation 302.

At operation 302, a user query is received. For example, the query may be received by the user service 216 from the user over the data portal 108 and provided to the rank service 300 using the search service 214. The query can include, for example, data regarding a request from the user for information. In some examples, the query may include structured information broken down into fields or otherwise tagged. For instance, the user may specify a date range, author, or other information as part of the query. In other examples, the query may be made in a free-form manner. In some examples, the rank service 300, search service 214, or another component may process the query. This may include, for example, checking for correctness (e.g., a valid date range when a date range is specified), standardizing nomenclature, or other processing. With the query received, the process 301 can move to operation 304.

At operation 304, results are obtained using the query. The results can be obtained through any of a number of suitable search algorithms or technologies. In some examples, the search service 214 can use a search platform, such as ELASTICSEARCH, APACHE SOLR, or SPHINX to perform the search based on the query. With the search performed, results can be obtained. The results can be scored in operation 306.

Operation 306 involves scoring the results. The rank service 300 can score search results based on a variety of factors, such as how well the results match the query. Based on one or more matches, a particular result can be scored or weighted higher or lower. In an example, scores for matches can be weighed in the following order with the items in the beginning of the list having a higher weight than items lower in the list: match on a report name or table name, match on database name, match on field name or column name, usage sort (e.g., higher ranked based on how often the data asset is used per platform), match on keywords or tags, match on description (e.g., reports, table, field), match on location, and match on owner. In addition, exact search matches can be ranked higher than partial matches. In some examples, scoring of results can be based on obtained lineage data of the results. In such examples, the process 301 can move to operation 307.

At operation 307, lineage information regarding the results is obtained. In an example, the lineage information is an attribute or metadata that is applied during the ingest process and may be used by the search. Lineage information can include information regarding how the data asset associated with the result came to be. For example, the data asset may come from a number of "upstream" tables or databases. The linage information can include information regarding the relationship of the data asset with other data. For instance, a result may be a report generated from a database, and the lineage information can include information about the database from which the report was generated. The lineage information may also include information about other documents that reference the report. This information can be fed back into the result scoring process and used to score the results. For example, results that have a larger lineage or more relationships can be scored higher than results with a smaller lineage or fewer relationships.

In an example, to obtain lineage or other relationship information, the portal services 110, search service 214, and/or the rank service 300 can include a lineage service. In an example, the lineage service can enable the data portal to POST an SQL statement and extract the upstream and downstream sources that are implicated. The lineage service can enable the dissection of SQL to parse tables that are used. As a simple example, where the linear services running on a local host, the following POST command can be run:

```
POST http://localhost:8085/lineage
{
    "sql": "select * from test"
}
``` and the response can be:

```
{
    "upstream": null,
    "downstream":
        [
            "test"
        ]
}
```

With the results scored, the process 301 can move to operation 308.

In operation 308, the results are modified based on the score. This can include, for example, ranking the results such that high scoring results appear before lower scoring results. In some examples, the results may be filtered based on the score such that only results with scores above a certain threshold remain and the other results are filtered out. In some examples, the scores are appended to the metadata of the results and can be presented to the user. For instance, the user may be able to view the scores given to the results. The user may then be able to sort, filter, or perform other operations on the results based on the scores. With the results modified, the process 301 can move to operation 310.

In operation 310, the results are provided to the user. This can involve, for instance, cooperating with the user service 216 to cause the results to be provided to the user over the data portal 108. The results can be provided to the user in any of a variety of ways. In some examples, one or more metadata values are presented to the user (e.g., the name of the data asset). In some examples, the results may include a link that the user can follow to access the data assets. In some examples, the results can be provided to the user via a downloadable file. In some examples, the results can be sent to the user via email or another messaging platform.

Returning to FIG. 2, the user service 216 can be a service configured to provide a variety of services, including services related to providing information to and receiving information from the user, as well as processing information. For example, the user service 216 can receive information (e.g., queries) provided by the user over the data portal 108 and provide the information to relevant components within the portal services 110 or can respond to the information directly. In another example, the user service 216 interfaces with the data portal 108 and facilitates providing information to the user over the portal 108.

In some examples, user service 216 can provide functionality to managing user-posted comments on the data portal.

For example, users can provide comments that provide additional background information or detail regarding metadata objects accessible through the data portal 108. In some examples, user service 216 can further provide features allowing users to tag data objects. In some examples, the user service 216 can further provide users with the ability to leave star ratings for metadata objects.

In further examples, the user service 216 can provide access controls that prevent unauthorized access to data. For example, the portal services 110 may ingest and index classified, confidential, sensitive, or other access-restricted data. While, in some examples, the ingested data is merely metadata regarding such access-restricted data assets (which itself enhances security), it may nonetheless be desirable to prevent unauthorized users to view the metadata and/or follow a link to the underlying data asset. In still further examples, for some data and/or some users, the user service 216 may allow users to view the metadata but not the underlying data or vice versa. In some examples, the user service 216 may provide information to unauthorized users regarding how to remedy the lack of access. An example of an access service 400 that may be implemented by the user service 216 is shown and described in FIG. 4.

Figure 4:
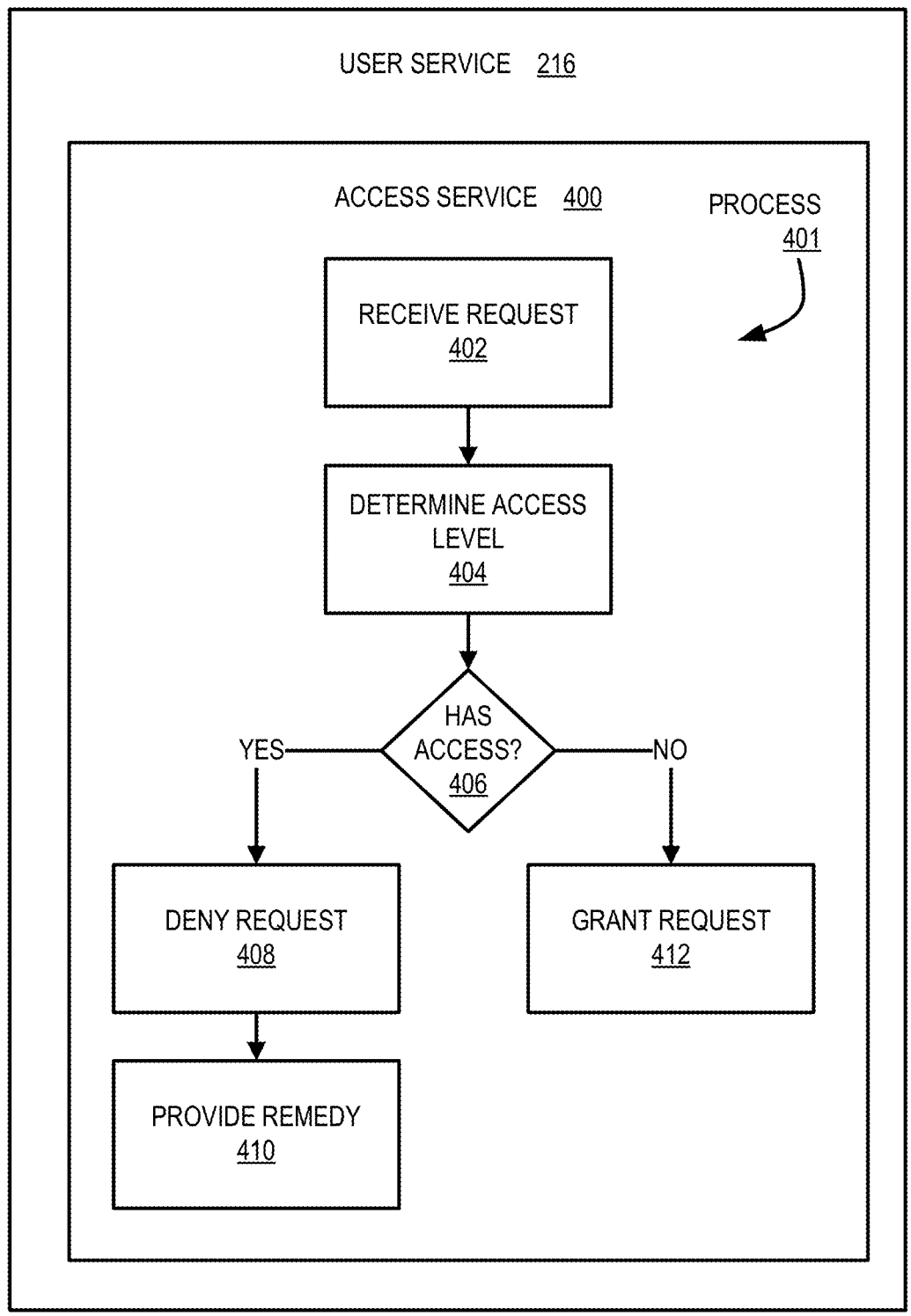
FIG. 4 illustrates an example access service that can be used by the user service to control access to information over the portal.

FIG. 4 illustrates an example access service 400 that can be used by the user service 216 to control access to information over the portal 108. In an example, the access service 400 can implement a process 401 for controlling access to data and providing remedies for lack of access. The process can begin with operation 402.

Operation 402 involves receiving a request. This can involve, for example, receiving a request from a user to access particular information over the portal 108, to access a particular document, to access particular metadata, to display particular search results, or another kind of request. In some examples, receiving a request in operation 402 can involve receiving a query from a user (e.g., as shown and described in FIG. 3). Operation 402 can be followed by operation 404.

Operation 404 involves determining an access level. This can involve, for example, determining an access level of the user sending the request. For example, the user may be logged into the portal using credentials, and the access service 400 can determine whether the credentials are associated with a particular access level, permissions, or other indication of authority. In some examples, the user may be prompted to provide access information (e.g., a username and password). A variety of different data formats for exchanging access data can be used, including Security Assertion Markup Language (SAML), among others. Operation 404 can be followed by operation 406.

Operation 406 involves determining whether the access level is sufficient for the request to be carried out. For example, where the request is viewing a document, the access level of the document and the user can be compared. If the user does not have sufficient access, then the process can move to operation 408. If the user has a sufficient access level, then the process 401 can move to operation 412.

Operation 408 involves denying the request. This can involve, for example, preventing the user from accessing a document that the user requested access. Where the request is for particular search results, the request may be denied by omitting the results from a list of results provided. After operation 408, the process can move to operation 410.

Operation 410 involves providing a remedy. This can involve providing the user with information over the portal such as contact information of a person with sufficient access to the one or more items (e.g., contact information of the user) or a procedure for gaining sufficient access to the one or more items.

At operation 412, the request can be granted. For example, where the request was to access a document, granting the request can involve providing the user with access to the document.

Figure 5:
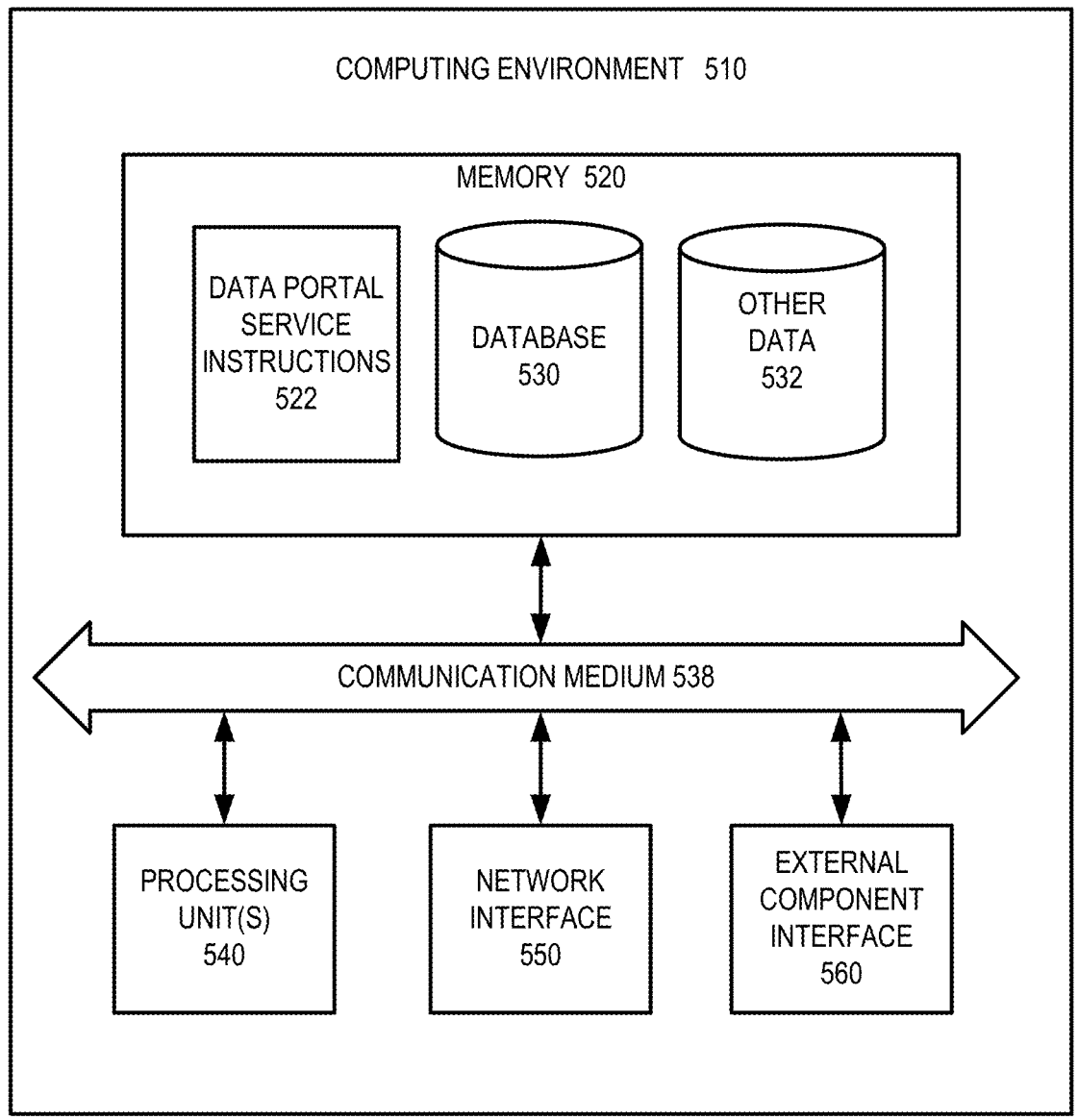
FIG. 5 illustrates an example system with which disclosed systems and methods can be used.

FIG. 5 illustrates an example system 500 with which disclosed systems and methods can be used. In an example, the user device 102, computing environment 106, and data source 112 can be implemented as one or more systems 500 or one or more systems having one or more components of systems 500. In an example, the system 500 can include a computing environment 510. The computing environment 510 can be a physical computing environment, a virtualized computing environment, or a combination thereof. The computing environment 510 can include memory 520, a communication medium 538, one or more processing units 540, a network interface 550, and an external component interface 560.

The memory 520 can include a computer readable storage medium. The computer storage medium can be a device or article of manufacture that stores data and/or computer-executable instructions. The memory 520 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 520 can store various types of data and software. For example, as illustrated, the memory 520 includes data portal service instructions 522 for implementing one or more aspects of the data portals described herein (e.g., as described in relation to FIGS. 1 and 2), database 530 (e.g., as described in relation to database 212 of FIG. 2), as well as other data 532. In some examples (e.g., where the computing environment 510 is a user device 102), the memory 520 can include instructions for accessing a data portal. In some examples (e.g., where the computing environment 510 is a data source 112), the memory 520 can include instructions for acting as a data source.

The communication medium 538 can facilitate communication among the components of the computing environment 510. In an example, the communication medium 538 can facilitate communication among the memory 520, the one or more processing units 540, the network interface 550, and the external component interface 560. The communications medium 538 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 540 can include physical or virtual units that selectively execute software instructions. In an example, the one or more processing units 540 can be physical products comprising one or more integrated circuits. The one or more processing units 540 can be implemented as one or more processing cores. In another example, one or more processing units 540 are implemented as one or more separate microprocessors. In yet another example embodiment, the one or more processing units 540 can include an application-specific integrated circuit (ASIC) that provides specific functionality. In yet another example, the one or more processing units 540 provide specific functionality by using an ASIC and by executing computer-executable instructions.

The network interface 550 enables the computing environment 510 to send and receive data from a communication network (e.g., network 140). The network interface 550 can be implemented as an Ethernet interface, a token-ring network interface, a fiber optic network interface, a wireless network interface (e.g., WI-FI), or another type of network interface.

The external component interface 560 enables the computing environment 510 to communicate with external devices. For example, the external component interface 560 can be a USB interface, Thunderbolt interface, a Lightning interface, a serial port interface, a parallel port interface, a PS/2 interface, and/or another type of interface that enables the computing environment 510 to communicate with external devices. In various embodiments, the external component interface 560 enables the computing environment 510 to communicate with various external components, such as external storage devices, input devices, speakers, modems, media player docks, other computing devices, scanners, digital cameras, and fingerprint readers.

Although illustrated as being components of a single computing environment 510, the components of the computing environment 510 can be spread across multiple computing environments 510. For example, one or more of instructions or data stored on the memory 520 may be stored partially or entirely in a separate computing environment 510 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:
   obtaining, from a plurality of data sources that are of one or more different data source types and store data assets comprised of underlying data and metadata describing the underlying data, the metadata of the data assets without accessing the underlying data of the data assets;
   storing the metadata in association with a search service; and
   making data stored in association with the search service, including the metadata, available over a data portal.

2. The method of claim 1, wherein obtaining the metadata comprises receiving metadata pushed from the plurality of data sources.

3. The method of claim 1, wherein obtaining the metadata comprises obtaining the metadata using a crawler.

4. The method of claim 1, wherein a data asset from the data assets comprises a database, and wherein the metadata describing the underlying data of the data asset comprises metadata describing at least one of: tables within the database and fields within the database.

5. The method of claim 4, wherein the metadata comprises metadata describing lineage data of the database or a table therein.

6. The method of claim 5, further comprising, responsive to receiving a query over the data portal, using the metadata describing the lineage data to determine relevance of a result to the query.

7. The method of claim 6, wherein the lineage data of the database or the table within the database includes an origin and subsequent applications of the database or the table within the database, and a larger lineage indicates a greater relevance of the result to the query.

8. A method comprising:
   receiving a query from a device;
   searching, based in part on the query, data associated with a search service to obtain search results, the data associated with the search service comprising metadata describing underlying data of data assets obtained from a plurality of differing types of data sources without accessing the underlying data of the data assets, wherein at least one search result of the obtained search results is associated with a database data asset comprising a database table or database report;
   obtaining, from at least a portion of the metadata describing the underlying data of the database data asset, a lineage of the database data asset, including an origin of the database data asset and subsequent applications of the database data asset;
   determining relevance of the database data asset to the query based, in part, on the lineage of the database data asset, wherein a larger lineage indicates a greater relevance of the search result to the query; and
   providing the search results to the device in response to the query based, in part, on the determined relevance.

9. The method of claim 8, wherein the data associated with the search service does not comprise the underlying data of the data assets.

10. The method of claim 8, wherein searchable data associated with the search service consists of metadata, including the metadata describing the underlying data of the data assets.

11. The method of claim 8, further comprising:
obtaining an access level associated with the query, wherein providing the search results is further based, in part, on the access level.

12. The method of claim 11, further comprising:
determining whether to grant access to one or more items in the search results based on the access level associated with the query; and
responsive to determining not to grant access, providing a remedy.

13. The method of claim 12, wherein the remedy comprises information selected from the group consisting of: contact information of a person having access to the one or more items and a procedure for gaining access to the one or more items.

14. The method of claim 8, further comprising:
obtaining, from the plurality of differing types of data sources, the metadata describing the underlying data of the data assets without accessing the underlying data of the data assets;
storing the metadata as part of the data associated with the search service; and
making the data associated with the search service available over a data portal,
wherein the query is received from the device over the data portal.

15. The method of claim 14, wherein obtaining the metadata comprises receiving metadata pushed from one or more of the plurality of differing types of data sources.

16. A non-transitory computer readable medium comprising instructions that, when executed by a processor, cause the processor to perform a process comprising:
obtaining, from a plurality of data sources that are of one or more different data source types and store data assets comprised of underlying data and metadata describing the underlying data, the metadata of the data assets without accessing the underlying data of the data assets;
storing the metadata in association with a search service; and
making data stored in association with the search service, including the metadata, available over a data portal.

17. The non-transitory computer readable medium of claim 16, wherein the process further comprises:
receiving a query from a device over the data portal;
searching, based in part on the query, the data stored in association with the search service to obtain search results; and
providing the search results to the device.

18. The non-transitory computer readable medium of claim 17, wherein at least one search result of the obtained search results is a database item comprising a database table or database report;
wherein the process further comprises determining relevance of the database item to the query based, in part, on a lineage of the database item; and
wherein the provided search results are based, in part, on the determined relevance.

19. The non-transitory computer readable medium of claim 17, wherein the data associated with the search service consists of metadata.

20. The non-transitory computer readable medium of claim 17, wherein the process further comprises:
obtaining an access level associated with the query;
determining whether to grant access to one or more items in the search results based on the access level associated with the query and the access level associated with the underlying data; and
responsive to determining not to grant access, providing a remedy,
wherein providing the search results is further based, in part, on the access level associated with the query and the access level associated with the underlying data.

* * * * *